United States Patent Office 3,459,528
Patented Aug. 5, 1969

3,459,528
UREA CONDENSATION PRODUCT SLOW RELEASE NITROGEN FERTILIZER COMPOUNDS AND THE PREPARATION THEREOF
Robert A. Wiesboeck and John D. Nickerson, Atlanta, Ga., assignors, by mesne assignments, to USS Agri-Chemicals, Inc., Pittsburgh, Pa., a corporation of Delaware
No Drawing. Filed Apr. 26, 1966, Ser. No. 545,261
Int. Cl. C05c 9/02
U.S. Cl. 71—28                                    6 Claims

ABSTRACT OF THE DISCLOSURE

Bis(ureidomethylene)isobutylenediurea which is useful as a slow release nitrogen fertilizer is prepared by reacting isobutylenediurea with formaldehyde to form the dimethylol derivative at about 60–90° C. and at a pH above 7, and condensing the reaction product with an excess of urea at 20–90° C. at a pH of 1–4.

---

This invention relates to nitrogen fertilizers and methods of preparation thereof, and more particularly to the preparation of non-burning, slow release nitrogen fertilizers.

Nearly all slow release nitrogen fertilizers on the market are based on urea-formaldehyde condensation products. These materials represent a mixture of polymethylene ureas of varying chain lengths depending on the ratio of urea to formaldehyde used in the preparation. In general, the release rate of these polymers is inversely proportional to the molecular size, the most desirable rate being found with polymers containing four to eight urea units per molecule. Polymers of higher chain lengths rapidly become unavailable, resulting in poor efficiency as fertilizer materials.

The key characteristic of the slowly available nitrogen in urea-formaldehyde products has been expressed as the "availability index of cold water-insoluble nitrogen." The analytical method for the "Nitrogen Activity Index (AI) of Urea-Formaldehyde Compounds" is given in the Official Methods of Analysis of the Association of Official Agricultural Chemists, tenth edition (1965), p. 19. The AI is calculated by the following equation:

Activity Index (AI) = (percent CWIN—percent HWIN) × 100/percent CWIN where

CWIN = cold water (25±2° C.) insoluble nitrogen
HWIN = hot water insoluble nitrogen Unfortunately, the condensation reaction of urea with formaldehyde cannot be controlled well enough to prevent the formation of highly polymeric materials and approximately one-third of the total nitrogen content becomes fixed and cannot be utilized by the plant.

The activity index (AI) of 40 percent or greater is deemed satisfactory for ureaform products, the guaranteed AI of commercial ureaform products being 48. It is desirable that the AI be higher than 48, and preferably as high as 100. An inherent advantage gained by higher AI values is that the nitrogen content, which is fixed or unavailable, is reduced proportionately as the AI value increases.

We have discovered that a new slow release nitrogen fertilizer derived from urea, formaldehyde and isobutyraldehyde can be prepared having an activity index substantially above 50 and approaching 100, the compound being a chemically uniform compound of constant molecular size. It does not contain highly polymeric material and is therefore more efficient as plant food.

A primary object, therefore, of the present invention is to provide a new slow release nitrogen fertilizer having a high activity index and high efficiency as plant food. A further object is to provide a new compound, bis(ureidomethylene)isobutylidenediurea. A still further object is to provide novel methods for the preparation of the slow release nitrogen fertilizer described. Other specific objects and advantages will appear as the specification proceeds.

The compound bis(ureidomethylene)isobutylidenediurea (I) is prepared by the two-step condensation reaction of isobutylidenediurea with formaldehyde and urea as outlined in the following equations:

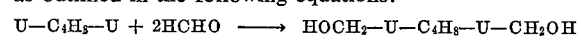

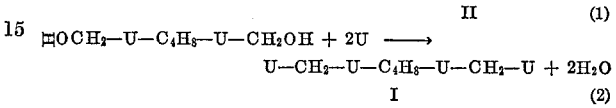

where U = urea.

In the first step (1), isobutylidenediurea is reacted with formaldehyde at about 60–90° C. and at a pH of about 8–9 to form the dimethylol derivative (II). This intermediate is then condensed with urea in acid medium to give bis(ureidomethylene)isobutylidenediurea (I). The condensation reaction is carried out at about 20–90° C. and at a pH of about 1–4.

In a specific example, 1 mole of isobutylidenediurea is reacted with 2.0–2.5 moles of 37% formaldehyde at about 75° C. and a pH of 8.5, and the intermediate dimethylol derivative is then condensed with urea, preferably at about 50° C. and at pH 3.

We prefer to employ the urea in excess in order to suppress polymer formation of the 1:1 reaction intermediate outlined below:

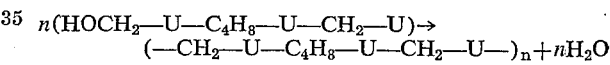

The nitrogen content of such a polymeric material is fixed to too great an extent and is therefore not available as plant food. Accordingly, the efficiency of such a fertilizer is considerably decreased. We prefer to employ the urea at a 2- to 5-fold excess in order to suppress the polymer formation described above.

If a small excess of urea is employed in the reaction, i.e., only about 3 moles of urea per mole of isobutylidenediurea, the product can be obtained by simply evaporating the total mixture after neutralization of the acid. In such a case, the fertilizer contains 37% nitrogen, of which one-fifth is immediately available as cold water soluble nitrogen.

The new fertilizer compound, bis(ureidomethylene)-isobutylidenediurea, is a discrete chemical compound having a satisfactory level of cold water insoluble nitrogen so as to allow classification as a slowly available source of nitrogen, while at the same time the high activity indicates almost complete availability.

The control of pH in the process of preparing bis-(ureidomethylene)isobutylidenediurea may be effected by using any acid medium. Since the type of acid is not critical, we prefer to use phosphoric or sulfuric acid, but any suitable acid may be used.

Specific examples illustrative of the invention may be set out as follows:

EXAMPLE I

One mole of isobutylidenediurea (174 g.) is added to 2.5 moles of 37% formaldehyde (203 g.), adjusted to pH 8 with triethanolamine, and heated to reflux for 40 minutes. Addition of a saturated solution of 6 moles of urea (360 g.) in water lowers the temperature to approximately 60° C. The mixture is acidified with phosphoric acid to pH 3 and maintained at 75° C. for two hours. After storage overnight at ambient temperature, the precipitate is collected by filtration, washed free of acid and urea, and dried at 60–80° C. The product (240 g.) melts at 210–215° C. with decomposition. The product analysis is:

| | Percent |
|---|---|
| Total N | 35 |
| CWIN | 21 |
| HWIN | 1 |
| AI | 95.3 |

EXAMPLE II

The process is carried out as described in Example I except that the mixture is acidified with sulfuric acid instead of phosphoric acid and to a pH of 2.

EXAMPLE III

The process is carried out as described in Example I except that only 3 moles of urea per mole of isobutylidenediurea is employed and the product is obtained by evaporating the total mixture after neutralization of the acid. The fertilizer contains 37% nitrogen, of which one-fifth is immediately available as cold water soluble nitrogen.

EXAMPLE IV

The process is carried out as described in Example I except that one mole of isobutylidenediurea is reacted with 2 moles of 37% formaldehyde, the pH being adjusted to pH 9, and the mixture heated to a temperature of about 80° C. The reaction product (dimethylolisobutylidenediurea) is condensed with urea as described in Example I. The final product, bis(ureidomethylene)isobutylidenediurea, is comparable to that described in Example I, containing no highly polymeric material. It is a chemically uniform compound of constant molecular size and is highly efficient as plant food.

As described in the foregoing, we prefer to carry out the first step in which isobutylidenediurea is reacted with formaldehyde at a pH above 7, and preferably about 8–9, while in the second step the reaction product is condensed with urea in an acid medium at a pH of about 1–4, the urea being added preferably in a 2-fold to 5-fold or greater excess per mole of isobutylidenediurea. If a smaller excess of urea is employed in the condensation operation, say, less than 4 moles of urea per mole of isobutylidenediurea, we prefer to neutralize the acid and then to evaporate the total mixture to obtain the product bis(ureidomethylene)isobutylidenediurea.

The foregoing products, as will be obvious to those skilled in the art, may be incorporated in mixed fertilizers containing supplemental rapidly-available nitrogen sources, conventional $P_2O_5$ and $K_2O$ sources, and other nutrient materials necessary for plant growth.

While in the foregoing specification we have set forth specific steps and procedure in considerable detail for the purpose of illustrating embodiments of the invention, it will be understood that such details may be varied widely by those skilled in the art without departing from the spirit of our invention.

We claim:
1. The compound bis(ureidomethylene)isobutylidenediurea.
2. A process for preparing bis(ureidomethylene)isobutylidenediurea which comprises reacting isobutylidenediurea with sufficient formaldehyde to form the dimethylol derivative at a temperature of about 60–90° C. and at a pH in excess of 7, and condensing the reaction product with excess urea at a pH of 1–4 and a temperature of 20–90° C. to produce bis(ureidomethylene)isobutylidenediurea.
3. A process for preparing bis(ureidomethylene)isobutylidenediurea which comprises reacting one mole of isobutylidenediurea with about 2.0–2.5 moles of formaldehyde to form the dimethylol derivative at about 60–90° C. and at a pH of about 8–9, and condensing the reaction product with excess urea at a temperature of 20–90° C. and at a pH of about 1–4 to produce bis(ureidomethylene)isobutylidenediurea.
4. The process of claim 3 in which condensation reaction is carried out at about 50° C. and at a pH of about 3.
5. A process for preparing bis(ureidomethylene)isobutylidenediurea which comprises reacting isobutylidenediurea with sufficient formaldehyde to form the dimethylol derivative at about 60–90° C. and at a pH of about 8–9, condensing the reaction product with excess urea in an acid medium, at a pH of 1–4 and a temperature of 20–90° C., neutralizing the acid, and evaporating the mixture to produce bis(ureidomethylene)isobutylidenediurea.
6. In a process in which isobutylidenediurea is reacted with formaldehyde to form as a reaction product the dimethylol derivative, the step of condensing the reaction product with excess urea at a pH of about 1–4 and at a temperature of about 20–90° C.

References Cited

UNITED STATES PATENTS

| 2,592,809 | 4/1952 | Kravolec et al. | 71—28 |
| 2,625,524 | 1/1953 | Kvalnes | 260—553 |
| 2,729,611 | 1/1956 | Chesley et al. | 71—28 |

S. LEON BASHORE, Primary Examiner

T. G. FERRIS, Assistant Examiner

U.S. Cl. X.R.
71—30; 260—553